United States Patent [19]

Epstein

[11] Patent Number: 4,572,565
[45] Date of Patent: Feb. 25, 1986

[54] STOPPER FOR A WIRE ROPE

[75] Inventor: Irving Epstein, Seattle, Wash.

[73] Assignee: Washington Chain & Supply Company, Inc., Seattle, Wash.

[21] Appl. No.: 639,633

[22] Filed: Aug. 9, 1984

[51] Int. Cl.⁴ .................... B66C 1/44; F16G 11/04
[52] U.S. Cl. .................... 294/102.1; 24/115 M; 24/136 R
[58] Field of Search .................... 294/86 R, 91, 102 R, 294/102 A, 114; 24/115 M, 132 R, 136 R, 136 L; 114/199; 188/65.1, 65.2; 403/367-369, 371, 374

[56] References Cited

U.S. PATENT DOCUMENTS

| | | | |
|---|---|---|---|
| 656,993 | 8/1900 | Mossman | 24/136 R |
| 749,896 | 1/1904 | Brown | 24/136 R |
| 944,141 | 12/1909 | Mounts | 24/136 R |
| 1,114,235 | 10/1914 | De Carteret | 24/136 R |
| 1,644,904 | 10/1927 | West | 24/136 R |
| 1,740,982 | 12/1929 | Hillier | 24/115 M |
| 1,864,802 | 6/1932 | Clark | 24/136 R |
| 1,945,438 | 1/1934 | Landahl | 24/136 R |
| 2,127,115 | 8/1938 | Hamilton | 24/115 M |
| 2,245,316 | 6/1941 | Amsler | 403/368 X |
| 4,068,608 | 1/1978 | Hartz | 294/114 X |

Primary Examiner—Johnny D. Cherry
Attorney, Agent, or Firm—Thomas W. Secrest

[57] ABSTRACT

This invention is directed to a stopper for a wire cable or a wire rope. It comprises to channels, two jaws moveable with respect to each other in the two channels and two wedges for moving the jaws. There are no gears for moving the jaws. With the movement of the wedges partially out of the channels the wedges force the jaws toward each other so as to clamp the wire cable or wire rope.

20 Claims, 15 Drawing Figures

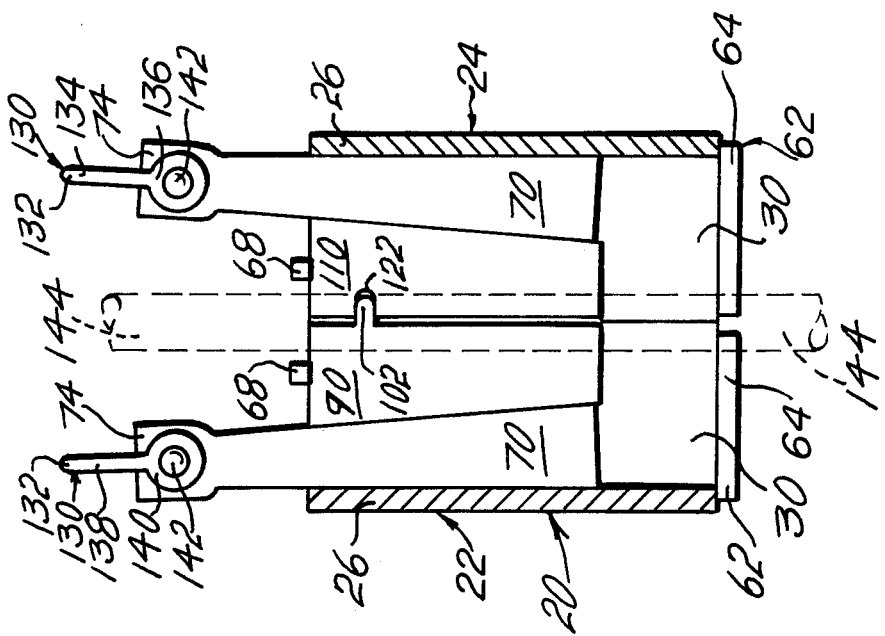
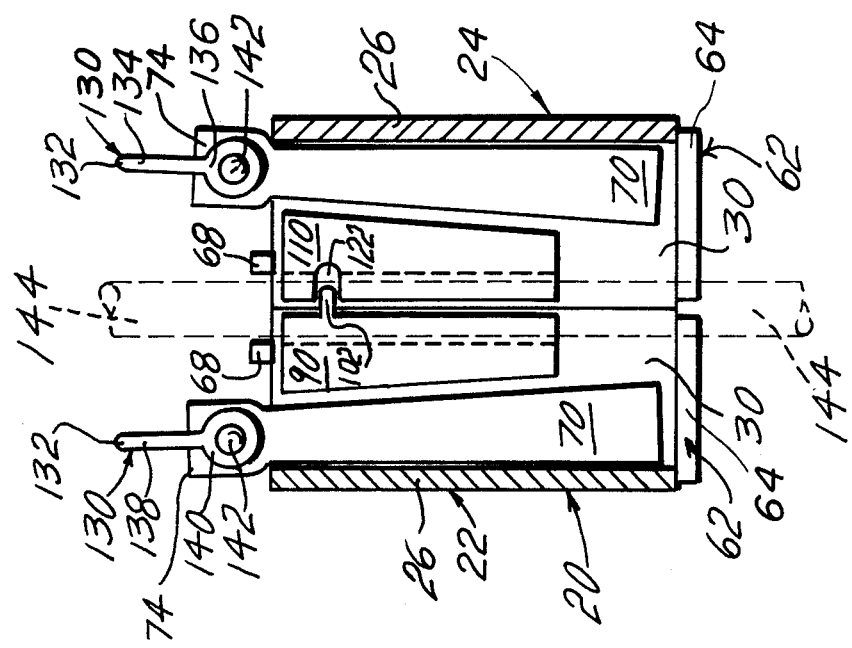

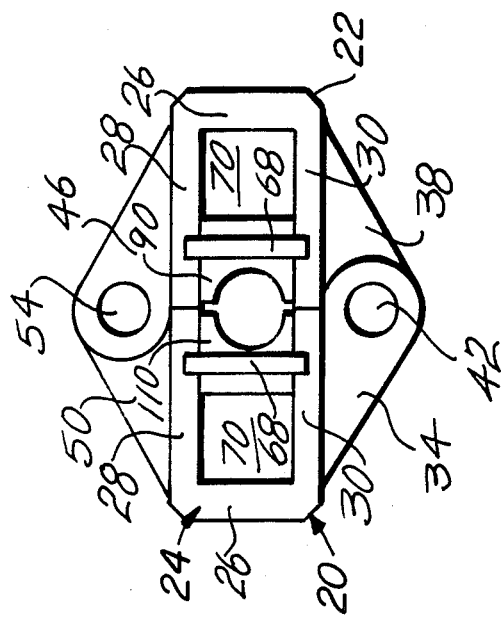

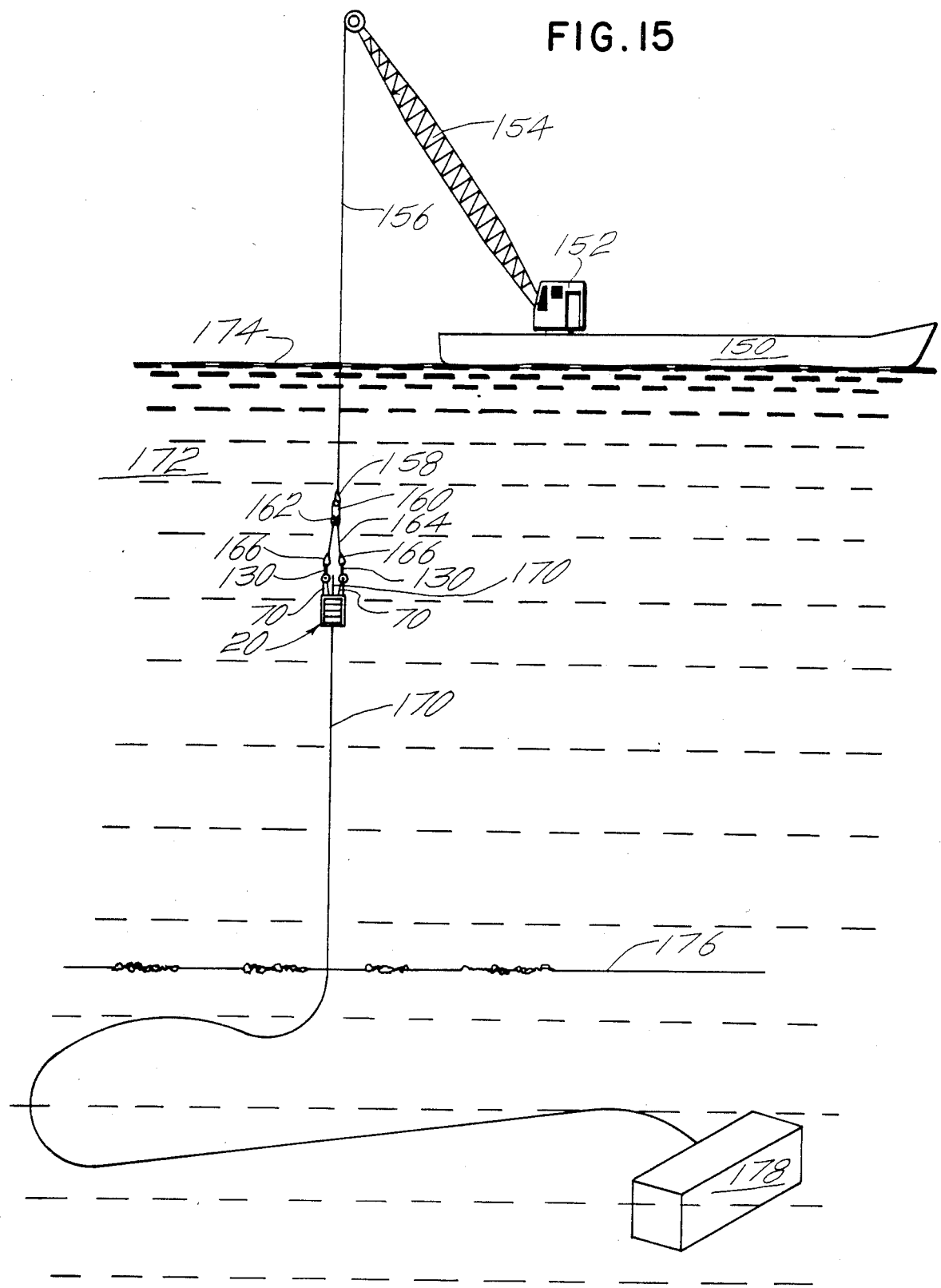

STOPPER FOR A WIRE ROPE

THE BACKGROUND OF THE INVENTION

There are many objects which are lifted and lowered by means of a rope. For example a sling with a load is lifted and lowered with the aid of a rope. In the unloading of fish from a fishing boat to a wharf or a dock or a larger boat a rope is used between a lifting device such as a boom and the load of fish. At a construction site such as a building, dam or bridge it is necessary to raise and to lower objects. A rope is often used for connecting between a crane and an object to be elevated or lowered. Also, a rope may interconnect between a pallet with a load and a crane or a boom.

There are certain objects which can connect directly with the cable such as pipe, equipment such as a compressor and a cement mixer and the like.

A crane and/or a boom lifts a cable and the cable lifts the object. Quite often, instead of the cable connecting with the crane or boom attaching directly to an object there is attached to the object a first cable. A second cable is on the crane or boom. It is necessary to interconnect the first cable and the second cable. A stopper for a rope is used to interconnect the first cable and the second cable. The first cable may connect with a load of fish in a sling. To interconnect the first cable and the second cable a stopper is used and the stopper should be of such a construction that it can be easily attached to the cable or cables. An example is that the stopper can connect first with the first rope and that there is an attaching means on the stopper for connecting with the second rope.

A BRIEF DESCRIPTION OF THE INVENTION

This invention is a stopper for a rope whereby the stopper can connect with a rope for definitely positioning the rope with respect to the stopper and for connecting with an attaching means for attaching the stopper to another rope. The stopper is free from levers and rotatable gears.

The stopper comprises a frame having channels. In the channels are moveable jaws which can be moved towards a rope. There are wedges in the frame for moving the jaws toward the rope. With the movement of the wedges the wedges bear against the moveable jaws and force the moveable jaws toward each other so as to clamp on to the rope and to definitely position the rope in the stopper.

Again, there are no levers and rotatable gears as such. There are wedges in a frame for moving the moveable jaws toward each other to clamp on to a rope.

THE DRAWINGS

In the drawings it is seen that:

FIG. 9 is a side elevational fragmentary view illustrating part of the frame members, a channel in each of the frame members, a wedge in each of the channels and also a jaw in each of the channels and with the wedges not in contact with the moveable jaws and also the moveable jaws partially separated;

Figure 12:
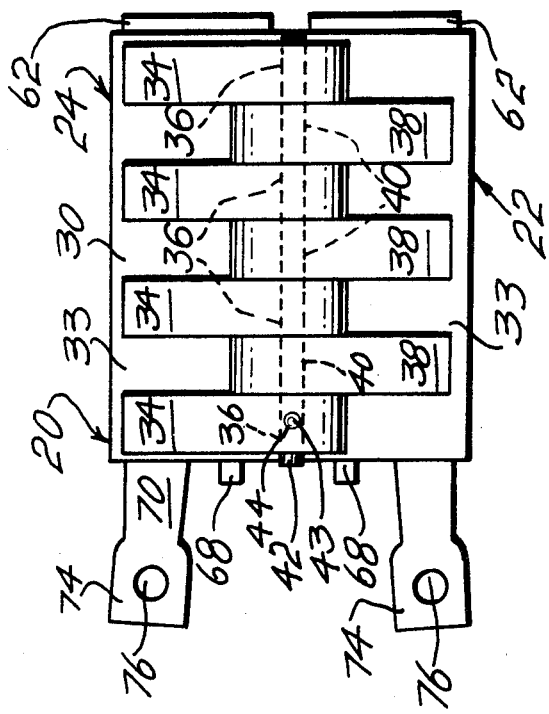
Figure 11:
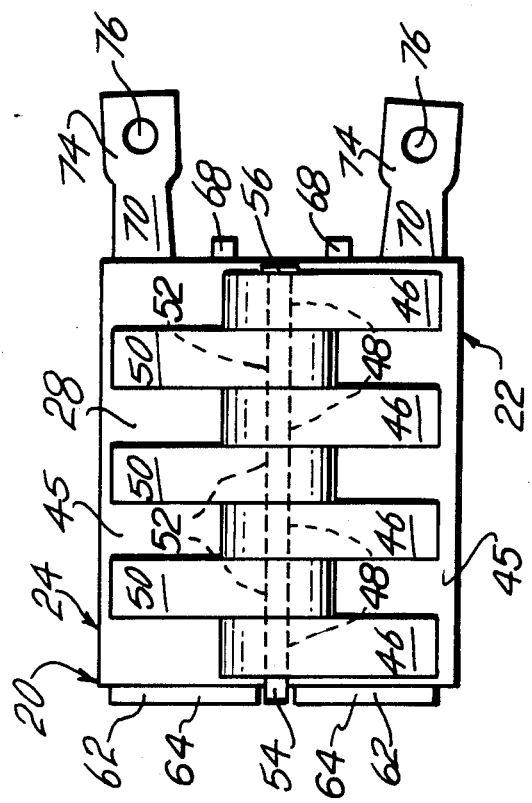

FIG. 10 is a fragmentary side elevational view of the stopper and illustrates the frame members, a channel in each of the frame members, a wedge in each of the channels and a moveable jaw in each of the channels and whereby the wedges have been moved to be in contact with the moveable jaws so as to force together the moveable jaws around the rope and thereby definitely positioning the rope with respect to the stopper;

FIG. 11 is a side elevational view of the stopper and illustrates the stopper in a closed position with a locking pin for locking the frame members into an integral unit;

FIG. 12 is a side elevational view of the other side of the stopper and illustrates the hinge means so as to allow the frame members to rotate with respect to each other and thereby open the stopper for reception of a rope and also to close the stopper so as to be able to firmly position the moveable jaws against the rope and the stopper;

FIG. 13 is a bottom plan view of the stopper;

FIG. 14 is a top plan view of the stopper;

FIG. 15 is a view of the stopper connecting with a rope so as to lift the rope and the load attached to the rope and also illustrates the attaching means for the stopper and shows the attaching means connecting with a crane by means of rope or connecting with a boom by means of a rope.

THE SPECIFIC DESCRIPTION OF THE INVENTION

In the drawings it is seen that there is a stopper 20 for rope. The term rope is used in a generic sense for wire cable and also for wire rope.

The stopper 20 comprises a frame having a first member 22 or a first U-channel 22 and a second member 24 or a second U-channel 24.

The first U-channel 22 has a base 26, a first leg 28 and a second leg 30. Similarly, the second U-channel 24 has a base 26, a first leg 28 and a second leg 30.

Figure 1:
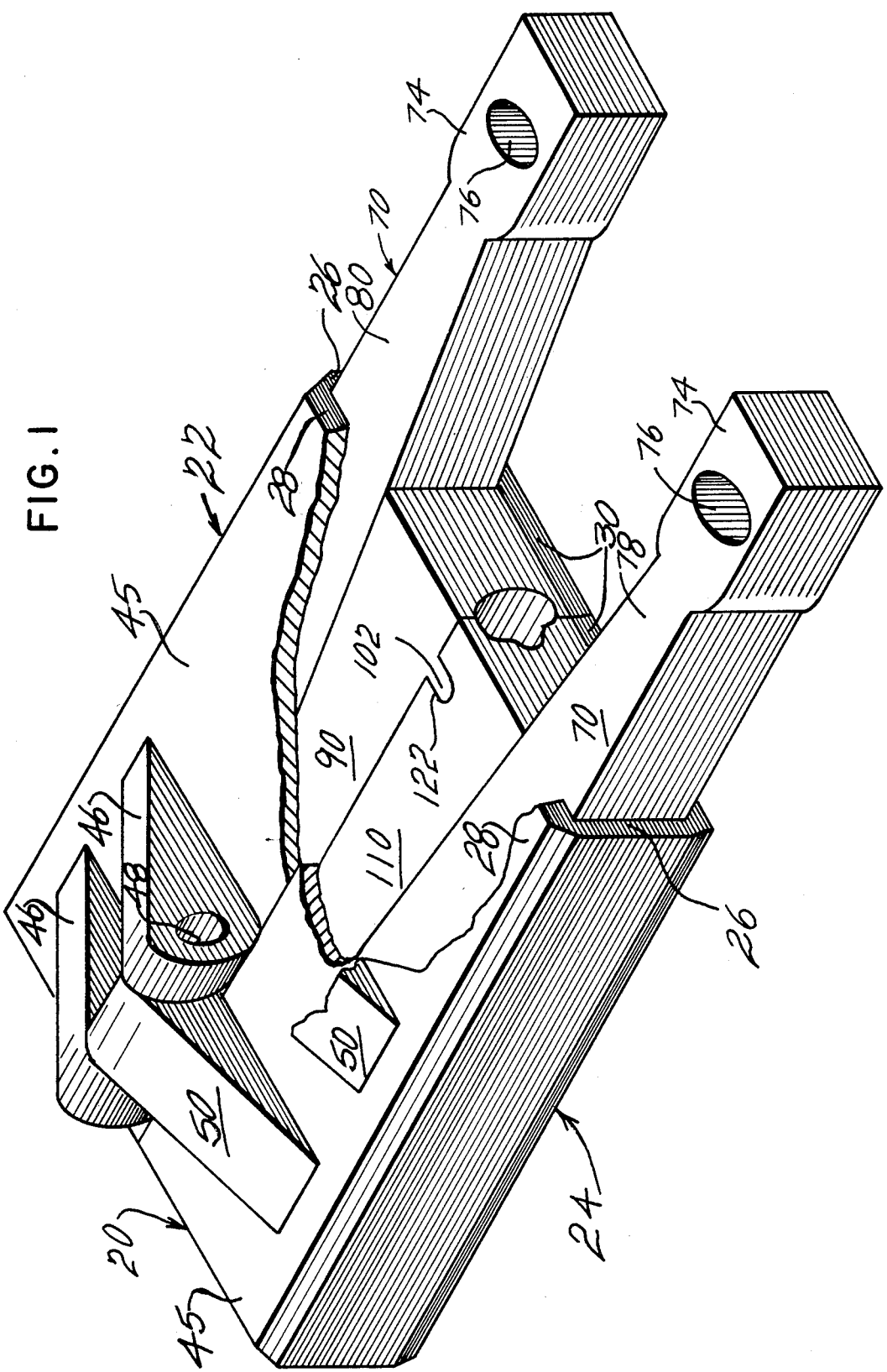
FIG. 1 is a fragmentary perspective view showing the frame with channels, wedges in the frame and moveable jaws in the frame.
Figure 2:
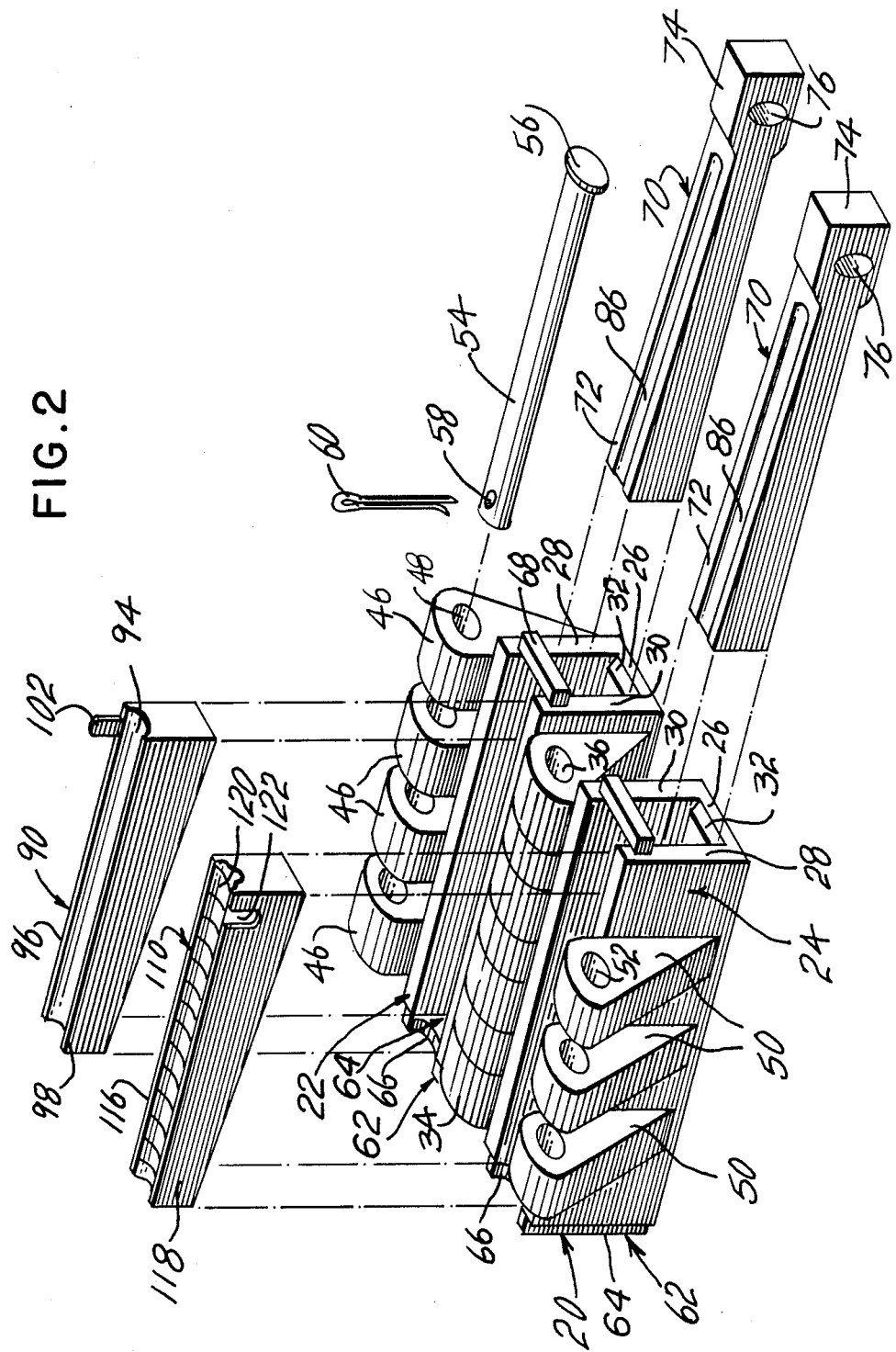
FIG. 2 is a exploded view of the stopper and illustrates the various components.

In FIG. 2 it is seen that the base 26 near the right end has a sloping surface 32 from the main part of the base to the edge of the base. The sloping surface is for ease of introduction of a wedge into the U-channel.

In FIG. 12 it is seen that on the back side of the U-channels 22 and 24 there is a surface identified as 33.

On the surface 33 of the U-channel 24 there are four ears 34. In each of the ears 34 there is a passageway 36.

On the back surface 33 of the U-channel 22 there are three ears 38. In each of the three ears 38 there is a passageway 40.

The ears 34 and 38 can be welded to the surface 33 of the respective U-channel.

The passageway 36 and the ears 34 and the passageway 40 and the ears 38 are aligned for receiving a pin 42.

In the left ear 34 there is a tapped passageway 43 for receiving a setscrew 44. The setscrew 44 definitely positions the pin 42 in the passageways 36 and 40. The ears 34 and 38 and the pin 42 allow the U-channels 22 and 24 to rotate.

In FIG. 11 it is seen that the U-channel 22 and the U-channel 24 have a front surface 45.

On the front surface of the U-channel 22 there are four ears 46. These ears can be welded to the U-channel 22.

Also, on the front surface of the U-channel 24 there are three ears 50. The ears 50 can be welded to the U-channel 24.

In each of the ears 46 there is a passageway 48.

In each of the ears 50 there is a passageway 52.

The passageways 48 and 52 are aligned for receiving a pin 54. The pin 54 has a head 56.

On the other end of the pin 54 there is a lateral passageway 58.

The pin 54 can be positioned in the passageways 48 and 52 and a keeper 60 positioned in the passageway 58. This prevents the pin 54 from escaping from the passageways 48 and 52. Further, the first U-channel 22 and the second U-channel 24 are locked in position and locked into a closed position.

In FIG. 2 it is seen that near the left end of the U-channels 22, 24 that there is an end plate 62 having a body 64 and a recess 66 for receiving the wire rope or wire cable.

Likewise, there is positioned over the left end of the U-channel 24 an end plate 62 having a body 64 with a recess 66 for receiving rope and cable.

On the right end of the U-channel 22 there is positioned a keeper 68 near the free ends to the legs 28 and 30.

Likewise, on the right end of the U-channel 24 there is positioned a keeper 68 near the free ends of the legs 28 and 30.

Figure 3:
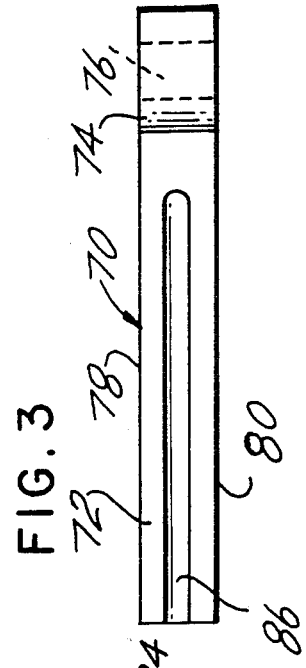
FIG. 3 is a side elevational view of the wedge.
Figure 4:
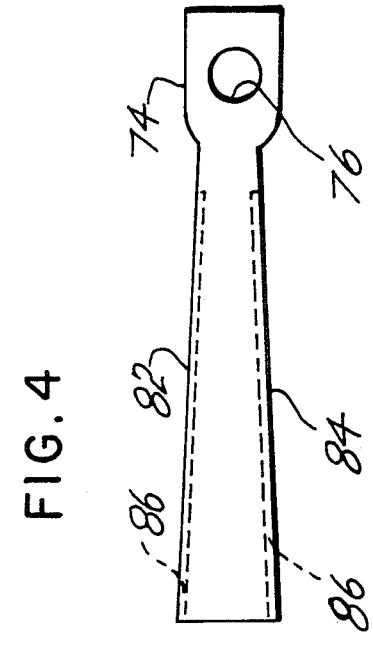
FIG. 4 is a plan view of the wedge.

In FIGS. 3 and 4 there is illustrated a wedge 70 having a body 72. At the right there is a head 74 having a passageway 76 for receiving an object such as a shackle or a rope and the like.

In FIG. 3 it is seen that there are flat parallel sides 78 and 80.

In FIG. 4 it is seen that the wedge 70 has two sides 82 and 84 which increase in thickness upon moving away from the head 74. Another way of expressing this is to say that the sides 82 and 84 converge upon moving toward the head 74.

In each of the sides 82 and 84 there is a groove 86.

Figure 5:
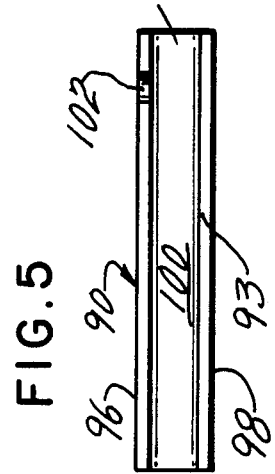
FIG. 5 is a side elevational view of a smooth jaw.
Figure 6:
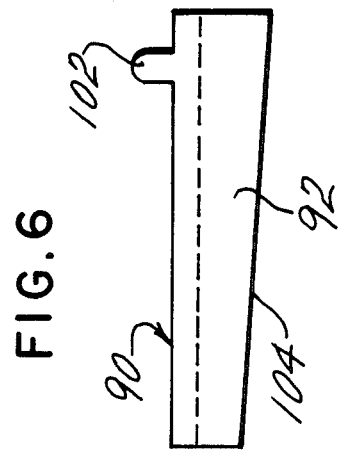
FIG. 6 is a plan view for the smooth jaw.

If FIGS. 5 and 6 there is illustrated a smooth jaw 90. The smooth jaw 90 may be considered to be an anvil.

The smooth jaw 90 has a body 92. There is a side 93 having a U-channel 94. The U-channel 94 is smooth.

In FIG. 5 it is seen that the smooth jaw 90 has two parallel sides 96 and 98.

The U-channel 94 has a smooth surface 100. Again, the smooth surface 100 may be considered to be the equivalent of an anvil.

In FIGS. 5 and 6 it is seen that near the right end or the wider end of the smooth jaw 90 there is a guide finger 102.

In FIG. 6 it is seen that the jaw 90 has a back surface 104. The side 93 and the back surface 104 converge upon moving away from the guide finger 102.

Figure 7:
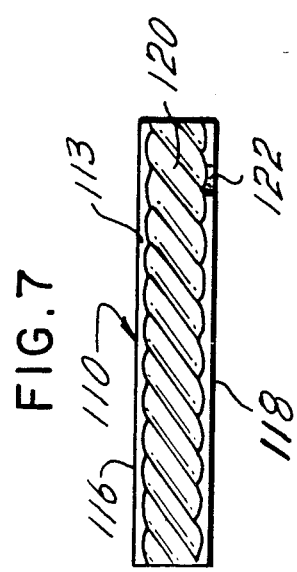
FIG. 7 is a side elevational view of a serrated jaw.
Figure 8:
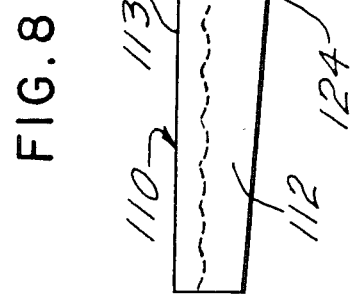
FIG. 8 is a plan view of a serrated jaw.

FIGS. 7 and 8 illustrate a serrated jaw 110.

The jaw 110 has a surface 113 in which there is a serrated U-channel 114. In FIG. 7 it is seen that the serrated U-channel 114 has a configuration of a wire rope or wire cable so as to cofit with the convolutions of the wire rope or the wire cable.

In FIG. 7 it is seen that there are parallel sides 116 and 118 on the body 112. The serrated surface of the U-channel 114 is given the reference numeral 120.

At the right end of the serrated jaw 110 and on that surface 113 there is a recess 122 to receive the guide finger 102 on the smooth jaw 90.

The serrated jaw 110 has a back surface 124.

The surfaces 113 and 124 converge upon moving away from the recess 122.

In FIGS. 9 and 10 there is a shackle 130 having a U-base 132, a first leg 134 with an eye 136 and a second leg 138 with an eye 140. The shackle 130 can be positioned so that the passageway 76 in the wedge 70 and the eyes 136 and 140 are aligned for receiving a pin 142.

There is a shackle 130 for each wedge 70.

A loop 166 may be passed between the U-base 132 and the wedge 70. Then, a cable 164 can be connected to the loop 166 so that the stopper 20 can be elevated.

In FIG. 9, a fragmentary view illustrating the position of the wedges 70 and the U-channels 22 and 24 and also illustrating the positions of the smooth jaw 90 and the serrated jaw 110 in the U-channels 22 and 24, there is a rope 144 or a wire cable 144 between the two jaws. In effect, the wedges 70 are almost all the way in the U-channels 22 and 24 and are not touching the jaws 90 and 110. Further, the jaws 90 and 110 are not in close contact with the rope 144 or the wire cable 144. Actually, FIG. 9 illustrates the position of the wedges, the jaws and the rope after the stopper 20 has been assembled but no load has been placed on the stopper 20.

With a load placed on the stopper 20 and the rope 144 connecting with a load and the stopper 20 being elevated the wedges 70 move upwardly with respect to the U-channels 22 or 24 or, conversely, the U-channels 22 and 24 move downwardly with respect to the wedges 70. With the movement of the wedges 70 in the U-channels 22 and 24 the grooved surfaces of the wedges contact the back surface 104 of the smooth jaw 90 and the back surface 124 of the serrated jaw 110 so as to force the two jaws tightly against the wire cable 144 or the rope 144. With the serrated surface 120 of the jaw 110 tight against the rope 144, the rope 144 is definitely positioned with respect to the stopper 20. At this time, the stopper 20 can be elevated and the rope 144 or the wire cable 144 can be elevated and firmly positioned between the jaws 90 and 110 of the stopper 20.

In FIGS. 9 and 10 it is seen that the end plate 62 prevents the wedges 70 falling out of the U-channels 22 and 24. In other words, the end plate 62 acts as a block to the wedges 70 moving downwardly and out of the channels 22 and 24 before the shackles 130 are attached to the wedges.

Also, in FIGS. 9 and 10 it is seen that the keepers 68 prevent the jaws 90 and 110 moving upwardly and out of the U-channels 22 and 24.

Further, in FIGS. 9 and 10 it is seen that the guide finger 102 and the recess 122 cooperate to definitely position the jaws with respect to each other so that the jaws can be driven toward each other with the movement of the wedges 70 so as to firmly grasp and position the rope 144 or the wire cable 144.

In FIG. 10 it is seen that the side 93 or surface 93 of the smooth jaw 90 and the surface 113 or the side 113 of the serrated jaw 110 are not actually bearing against each other as the jaws are firmly binding the rope 144 or the wire cable 144.

Further, it is to be noted that the stopper 20 can be used for various size rope 144 or wire cable 144 by varying the size of the smooth jaw 90 and the serrated jaw 110. For a smaller rope 144 the depth of the U-channel 94 and the jaw 90 and the depth of the U-channel 114 and the jaw 110 can be less. Conversely, with a large rope 144 the depth of the channel 94 in the jaw 90 and the depth of the channel 114 and the jaw 110 can be greater to accommodate the larger rope or wire cable.

In FIG. 11 it is seen that there are U-channels and on one of the U-channels there are welded ears 46. In the ear 46 there are aligned passageways 48. On the other U-channel there are ears 50. In the ears 50 there are aligned passageways 52. A removable pin 54 can be placed in these passageways 48 and 52 so as to lock together the U-channels. In the U-channels there is a smooth jaw 90 in one of the channels and a serrated jaw 110 in the other channel. There are wedges 70. With the pin 54 in the passageways 48 and 52 in the ears then the channels are locked into position. A rope or a cable between the jaws 90 and 110 is positioned whereby, with the movement of the wedges 70 out of the channels, the jaws 90 and 110 are pushed against the rope and the rope is locked into position.

In FIG. 12 there is an illustration of the back surface of the U-channels. On one of these U-channels there are ears 34 having passageways 36. On the other U-channel there are ears 38 having passageways 40. A pin 42 is in the passageways 36 and 40. A setscrew 44 is in a tapped opening in one of the ears and this setscrew locks the pin or sets the pin 42 into position. The U-channels can rotate around the pin 42 so as to allow the stopper 20 to open for receiving a cable or a rope. Then, with the stopper 20 in closed position the jaws 90 and 110 can be forced together so as to definitely position the cable or rope. Also, with the pin 54 removed from the passageways 48 and 52 it is possible for the channels to rotate away from each other so as to remove the cable or rope from the U-channels or the stopper 20.

In FIG. 13 there is a bottom plan view of the stopper 20 showing the end plate 62 on the bottom of each of the U-channels. In each of the end plates 62 there is a recess 66 for receiving a rope or cable. The end plate 62 prevents the jaws 90 and 110 and also the wedges 70 falling out of the bottom of the stopper.

In FIG. 14 there is a top plan view of the stopper 20. It is seen that in each of the openings of the U-channels that there is a keeper 68 for maintaining the jaws 90 and 110 in the U-channels. The wedges 70 are free to move in the U-channels and can, partially, move out of the U-channels. However, the keeper 68 prevents the jaws 90 and 110 from moving out of the upper opening in the U-channels.

In FIG. 15 there is a schematic illustration of the use of the stopper 20 with a boom boat 150. On the boom boat 150 there is boom cabin 152 for controlling the movement of the boom 154. There is associated with the boom 154 a cable 156. On the lower end of the cable 156 there is an eye 158. There is an intermediate cable 160 which passes through the eye 158. On each end of the intermediate cable 160 there is loop 162.

A connecting cable 164 passes through the two loops 162. On the ends of the connecting cable 164 are two loops 166. Each of the loops 166 connects with the shackle 130. Each of the shackles 130 connects with a wedge 70, see FIGS. 9 and 10. The wedges 70 are partially in the stopper 20 and partially out of the stopper 20. A cable 170 is between the smooth jaw 90 and the serrated jaw 110 in the stopper 20. With the upward movement of the cable 156 the wedges 70 force the jaws 90 and 110 toward each other so as to firmly clamp the cable 170 or rope 170 between these two jaws.

There is a body of water 172 having a surface 174. The boom boat 150 floats on the body of water 172. A body of water 172 may be an ocean, lake, river or the like. The body of water 172 rests on the floor 176.

The cable 156 is partially in the water 172 and partially out of the water 172. In FIG. 15 it is seen that the cable 170 is in the water 172 and connects with an object 178. The object 178 is to be hoisted and may be a crashpot or the like.

With the upward movement of the cable 156 the wedges 70 move upwardly so as to force the jaws 90 and 110 toward each other to firmly grasp and grip the cable 170 or the rope 170 and thereby definitely position the cable 170 or rope 170. The cable 156, stopper 20, cable 170 and object 178 can be hoisted out of the body of water and onto the boom boat 150.

RESUME

The stopper 20 comprises two movable jaws 90 and 110. These jaws are recessed to receive a depending wire rope 144 or cable 144.

There are two wedges 70 for forcing the two movable jaws, 90 and 110, toward each other to clamp onto the depending wire rope or depending cable 144.

There is a frame for holding and positioning the two wedges and the two jaws. The frame comprises the two rotatable members 22 and 24. These rotatable members 22 and 24 can be rotated to open the stopper 20 for receiving the wire rope 144 or for releasing the cable 144.

There is an attaching means to the stopper 20 for attaching the suspending wire rope 156 or cable 156. In effect, the attaching means connects to the upper part of the wedges 70.

The result is that in lifting the stopper 20 the wedges 70 move upwardly to move the jaws 90 and 110 toward each other and to clamp a depending wire rope between them. Then, with the upward movement of the suspending wire rope 156 the stopper 20 moves upwardly and the depending wire rope 144 moves upwardly with the load attached to the wire rope 144.

The suspending wire rope 156 may be connected to a boom or a wench or other suitable means for moving the suspending wire rope.

The suspending wire rope 156, stopper 20 and depending wire rope 144 can be moved from a first position to a second position and, when necessary, the suspending wire rope 56 can be lowered so as to lower the stopper 20 and the depending wire rope 144 and the load to the second position.

In effect, the applicant has provided a very straightforward stopper, free of gears, and comprising essentially, two jaws and two wedges for moving the jaws.

The applicant considers that the invention is new and not obvious. There are no rotating gears for moving jaws with respect to each other to clamp onto a rope or a cable or to release a rope or a cable. The invention comprises a guide in the form of U-channels 22 and 24. In the U-channels 22 and 24 are jaws 90 and 110 for receiving rope or wire cable. Also, in the U-channels 22 and 24 are wedges 70. The wedges 70 can move so as to be partially in the U-channels and partially out of the U-channels. With a rope between the jaws 90 and 110 and a pull on the wedges 70 the wedges 70 force the jaws 90 and 110 toward each other so as to clamp the rope or wire cable.

The applicant considers this mechanical structure to be of a straightforward design not requiring gears. For example, the U-channel can be made by welding pieces of metal together or else by milling a piece of metal. The jaws and wedges can be made on a milling machine. There is no need for a gear cutting machine.

The applicant considers the invention to be useful as it can be interposed between a wire cable or a rope attached to a boom and a wire cable or rope attached to a load to be lifted or lowered. In essence, the stopper 20 assists in the lifting of an object by a boom and a cable.

The applicant has used the term cable and rope synonymously. There can be used a wire cable or a wire rope.

I claim:

1. A stopper for rope, said stopper comprising:
   a. a frame;
   b. said frame comprising a first U-channel and a second U-channel;
   c. said first U-channel comprising a base and a first leg and a second leg;
   d. said second U-channel comprising a base and a first leg and a second leg;
   e. a hinge means connecting with said first U-channel and with said second U-channel to allow said first U-channel and said second U-channel to rotate toward each other and to rotate away from each other;
   f. in a closed position said legs of said first U-channel juxtapositioned to said legs of said second U-channel;
   g. a jaw identified as a first jaw in said first U-channel and having a U-channel for contacting said rope;
   h. a wedge identified as a first wedge in said first U-channel and positioned between said base and said first jaw;
   i. a jaw identified as a second jaw in said second U-channel and having a U-channel for contacting said rope;
   j. a wedge identified as a second wedge in said second U-channel and positioned between said base and said second jaw;
   k. said first wedge has a head which is outside of said first U-channel and a body which increases in thickness upon moving away from said head;
   l. said second wedge has a head which is outside of said second U-channel and a body which increases in thickness upon moving away from said head;
   m. each head of each wedge having a means for receiving an object such as a shackle or a cable; and,
   n. a locking means connecting with said first U-channel for definitely positioning said first U-channel and said second U-channel in a closed position for said first jaw and said second jaw to be juxtapositioned to said rope.

2. A stopper for rope according to claim 1 comprising:
   a. said hinge means comprising an ear on said first U-channel and an ear on said second U-channel;
   b. a passageway in each ear of said hinge means;
   c. said ears of said hinge means overlap and said passageways being aligned; and,
   d. a pin in said passageways of said ears of said hinge means.

3. A stopper for rope according to claim 1 comprising:
   a. said locking means comprising an ear on said first U-channel and an ear on said second U-channel;
   b. a passageway in each ear of said locking means;
   c. said ears of said locking means overlap and said passageways being aligned; and,
   d. a pin in said passageways of said ears of said locking means.

4. A stopper for rope according to claim 1 comprising:
   a. said stopper being adapted to be positioned in an upright position with said first U-channel and said second U-channel in an upright position and with said head of said first wedge above said frame and with said head of said second wedge above said frame;
   b. an end plate over the lower end of said first U-channel to assist in positioning said first jaw and said first wedge in said first U-channel;
   c. an end plate over the lower end of said second U-channel to assist in positioning the said second jaw and said second wedge in said second U-channel;
   d. a keeper over the upper end of said first U-channel to assist in positioning said first jaw; and,
   e. a keeper over the upper end of said second U-channel to assist in positioning said second jaw.

5. A stopper for rope according to claim 1 comprising:
   a. said U-channel of said first jaw being smooth;
   b. said first jaw having a guide finger;
   c. said U-channel of said second jaw being serrated;
   d. said second jaw having a recess; and,
   e. said recess of said second jaw receiving said guide finger.

6. A stopper for rope according to claim 1 comprising:
   a. said hinge means comprising an ear on said first U-channel and an ear on said second U-channel;
   b. a passageway in each ear of said hinge means;
   c. said ears of said hinge means overlap and said passageways being aligned;
   d. a pin in said passageways of said ears of said hinge means;
   e. said locking means comprising an ear on said first U-channel and an ear on said second U-channel;
   f. a passageway in each ear of said locking means;
   g. said ears of said locking means overlap and said passageways being aligned;
   h. a pin in said passageway of said ears of said locking means;
   i. said stopper being adapted to be positioned in an upright position with said first U-channel and said second U-channel in an upright position and with said head of said first wedge above said frame and with said head of said second wedge above said frame;
   j. an end plate over the lower end of said first U-channel to assist in positioning said first jaw and said first wedge in said first U-channel;
   k. an end plate over the lower end of said second U-channel to assist in positioning said second jaw and said second wedge in said second U-channel;
   l. a keeper over the upper end of said first U-channel to assist in positioning said first jaw;
   m. a keeper over the upper end of said second U-channel to assist in positioning said second jaw;
   n. said U-channel of said first jaw being smooth;
   o. said first jaw having a guide finger;
   p. said U-channel of said second jaw being serrated;
   q. said second jaw having a recess; and, r. said recess of said second jaw receiving said guide finger.

7. A combination of a rope and a stopper for said rope:
said stopper comprising:
a. a frame;
b. said frame comprising a first U-channel and a second U-channel;
c. said first U-channel comprising a base and a first leg and a second leg;
d. said second U-channel comprising a base and a first leg and a second leg;
e. a hinge means connecting with said first U-channel and with said second U-channel to allow said first U-channel and said second U-channel to rotate toward each other and to rotate away from each other;
f. in a closed position said legs of said first U-channel juxtapositioned to said legs of said second U-channel;
g. a jaw identified as a first jaw in said first U-channel and having a U-channel for contacting said rope;
h. a wedge identified as a first wedge in said first U-channel and positioned between said base and said first jaw;
i. a jaw identified as a second jaw in said second U-channel and having a U-channel for contacting said rope;
j. a wedge identified as a second wedge in said second U-channel and positioned between said base and said second jaw;
k. said first wedge has a head which is outside of said first U-channel and a body which increases in thickness upon moving away from said head;
l. said second wedge has a head which is outside of said second U-channel and a body which increases in thickness upon moving away from said head;
m. each head of each wedge having a means for receiving an object such as a shackle or a cable;
n. a locking means connecting with said first U-channel for definitely positioning said first U-channel and said second U-channel in a closed position for said first jaw and said second jaw to be juxtapositioned to said rope; and,
o. said rope being positioned between said first jaw and said second jaw and contacting said first jaw and said second jaw.

8. A combination of a rope and a stopper according to claim 7 comprising:
a. said hinge means comprising an ear on said first U-channel and an ear on said second U-channel;
b. a passageway in each ear of said hinge means;
c. said ears of said hinge means overlap and said passageways being aligned; and,
d. a pin in said passageways of said ears of said hinge means.

9. A combination of a rope and a stopper according to claim 7 comprising:
a. said locking means comprising an ear on said first U-channel and an ear on said second U-channel;
b. a passageway in each ear of said locking means;
c. said ears of said locking means overlap and said passageways being aligned; and,
d. a pin in said passageways of said ears of said locking means.

10. A combination of a rope and a stopper according to claim 7 comprising:
a. said stopper being adapted to be positioned in an upright position with said first U-channel and said second U-channel in an upright position and with said head of said first wedge above said frame and with said head of said second wedge above said frame;
b. an end plate over the lower end of said first U-channel to assist in positioning said first jaw and said first wedge in said first U-channel;
c. an end plate over the lower end of said second U-channel to assist in positioning said second jaw and said second wedge in said second U-channel;
d. a keeper over the upper end of said first U-channel to assist in positioning said first jaw; and,
e. a keeper over the upper end of said second U-channel to assist in positioning said second jaw.

11. A combination of a rope and a stopper according to claim 7 comprising:
a. said U-channel of said first jaw being smooth;
b. said first jaw having a guide finger;
c. said U-channel of said second jaw being serrated;
d. said second jaw having a recess; and,
e. said recess of said second jaw receiving said guide finger.

12. A combination of a rope and a stopper according to claim 7 comprising:
a. said hinge means comprising an ear on said first U-channel and an ear on said second U-channel;
b. a passageway in each ear of said hinge means;
c. said ears of said hinge means overlap and said passageway being aligned;
d. a pin in said passageways of said ears of said hinge means;
e. said locking means comprising an ear on said first U-channel and an ear on said second U-channel;
f. a passageway in each ear of said locking means;
g. said ears of said locking means overlap and said passageways being aligned;
h. a pin in said passageways of said ears of said locking means;
i. said stopper being adapted to be positioned in an upright position with said first U-channel and said second U-channel in an upright position and with said head of said first wedge above said frame and with said head of said second wedge above said frame;
j. an end plate over the lower end of said first U-channel to assist in positioning said first jaw and said first wedge in said first U-channel;
k. an end plate over the lower end of said second U-channel to assist in positioning said second jaw and said second wedge in said second U-channel;
l. a keeper over the upper end of said first U-channel to assist in positioning said first jaw;
m. a keeper over the upper end of said second U-channel to assist in positioning said second jaw;
n. said U-channel of said first jaw being smooth;
o. said first jaw having a guide finger;
p. said U-channel of said second jaw being serrated;
q. said second jaw having a recess; and,
r. said recess of said second jaw receiving said guide finger.

13. A combination of a rope, a stopper for said rope and an attaching means for said stopper:
a. a frame;
b. said frame comprising a first U-channel and a second U-channel;

c. said first U-channel comprising a base and a first leg and a second leg;

d. said second U-channel comprising a base and a first leg and a second leg;

e. a hinge means connecting with said first U-channel and with said second U-channel to allow said first U-channel and said second U-channel to rotate toward each other and to rotate away from each other;

f. in a closed position said legs of said first U-channel juxtapositioned to said legs of said second U-channel;

g. a jaw identified as a first jaw in said first U-channel and having a U-channel for contacting said rope;

h. a wedge identified as a first wedge in said first U-channel and positioned between said base and said first jaw;

i. a jaw identified as a second jaw in said second U-channel and having a U-channel for contacting said rope;

j. a wedge identified as a second wedge in said second U-channel and positioned between said base and said second jaw;

k. said first wedge has a head which is outside of said first U-channel and a body which increases in thickness upon moving away from said head;

l. said second wedge has a head which is outside of said second U-channel and a body which increases in thickness upon moving away from said head;

m. each head of each wedge having a means for receiving an attaching means such as a shackle or a cable;

n. a locking means connecting with said first U-channel for definitely positioning said first U-channel and said second U-channel in a closed position for said first jaw and said second jaw to be juxtapositioned to said rope; and, o. said attaching means connecting with the head of said first wedge and connecting with the head of said second wedge.

14. A combination of a rope, a stopper for rope and an attaching means according to claim 13 comprising:

a. said hinge means comprising an ear on said first U-channel and an ear on said second U-channel;

b. a passageway in each ear of said hinge means;

c. said ears of said hinge means overlap and said passageways being aligned; and, d. a pin in said passageways of said ears of said hinge means.

15. A combination of a rope, a stopper for rope and an attaching means according to claim 13 comprising:

a. said locking means comprising an ear on said first U-channel and an ear on said second U-channel;

b. a passageway in each ear of said locking means;

c. said ears of said locking means overlap and said passageways being aligned; and, d. a pin in said passageways of said ears of locking means.

16. A combination of a rope, a stopper for rope and an attaching means according to claim 13 comprising:

a. said stopper being adapted to be positioned in an upright position with said first U-channel and said second U-channel in an upright position and with said head of said first wedge above said frame and with said head of said second wedge above said frame;

b. an end plate over the lower end of said first U-channel to assist in positioning said first jaw and said first wedge in said first U-channel;

c. an end plate over the lower end of said second U-channel to assist in positioning said second jaw and said second wedge in said second U-channel;

d. a keeper over the upper end of said first U-channel to assist in positioning said first jaw; and, e. a keeper over the upper end of said second U-channel to assist in positioning said second jaw.

17. A combination of a rope, a stopper for rope and an attaching means according to claim 13 comprising:

a. said U-channel of said first jaw being smooth;

b. said first jaw having a guide finger;

c. said U-channel of said second jaw being serrated;

d. said second jaw having a recess; and, e. said recess of said second jaw receiving said guide finger.

18. A combination of a rope, a stopper for rope and an attaching means according to claim 13 comprising:

a. said hinge means comprising an ear on said first U-channel and an ear on said second U-channel;

b. a passageway in each ear of said hinge means;

c. said ears of said hinge means overlap and said passageways being aligned;

d. a pin in said passageways of said ears of said hinge means;

e. said locking means comprising an ear on said first U-channel and an ear on said second U-channel;

f. a passageway in each ear of said locking means;

g. said ears of said locking means overlap and said passageways being aligned;

h. a pin in said passageways of said ears of said locking means;

i. said stopper being adapted to be positioned in an upright position with said first U-channel and said second U-channel in an upright position and with said head of said first wedge above said frame and with said head of said second wedge above said frame;

j. an end plate over the lower end of said first U-channel to assist in positioning said first jaw and said first wedge in said first U-channel;

k. an end plate over the lower end of said second U-channel to assist in positioning said second jaw and said second wedge in said second U-channel;

l. a keeper over the upper end of said first U-channel to assist in positioning said first jaw;

m. a keeper over the upper end of said second U-channel to assist in positioning said second jaw;

n. said U-channel of said first jaw being smooth;

o. said first jaw having a guide finger;

p. said U-channel of said second jaw being serrated;

q. said second jaw having a recess; and, r. said recess of said second jaw receiving said guide finger.

19. A method for forcing a first jaw and a second jaw against a rope, said method comprising:

a. positioning said first jaw in a frame and adjacent to said rope;

b. positioning said second jaw in said frame and adjacent to said rope;

c. said rope being in a position to be suspended from said first jaw and from said second jaw;

d. positioning a first wedge in said frame and adjacent to said first jaw and having a head outside of said frame and extending away from said rope;

e. positioning a second wedge in said frame and adjacent to said second jaw and having a head outside of said frame and extending away from said rope; and, f. operatively, connecting a cable to said head of said first wedge and to said head of said second wedge to move said first wedge against said first jaw to contact said rope and to move said second wedge against said second jaw to contact said rope to be able to lift said frame, said first wedge, said first jaw, said second wedge, said second jaw and said rope.

20. A method according to claim 19 and comprising:

a. simultaneously moving said first wedge and said second wedge to move said first jaw and said second jaw against said rope to firmly position said rope and said first jaw and said second jaw with respect to each other.

* * * * *